Sept. 29, 1953

D. W. RIVENBURG 2,654,057

ELECTRONIC AMPLIFYING APPARATUS

Filed Aug. 21, 1950

2 Sheets-Sheet 1

Inventor
DOUGLAS W. RIVENBURG

By George H. Fisher

Attorney

Sept. 29, 1953
D. W. RIVENBURG
2,654,057
ELECTRONIC AMPLIFYING APPARATUS
Filed Aug. 21, 1950
2 Sheets-Sheet 2

Inventor
DOUGLAS W. RIVENBURG
By
George H. Fisher
Attorney

Patented Sept. 29, 1953

2,654,057

UNITED STATES PATENT OFFICE 2,654,057

ELECTRONIC AMPLIFYING APPARATUS

Douglas W. Rivenburg, Minneapolis, Minn., assignor to Minneapolis-Honeywell Regulator Company, Minneapolis, Minn., a corporation of Delaware Application August 21, 1950, Serial No. 180,662

6 Claims. (Cl. 317—137)

Figure 1:
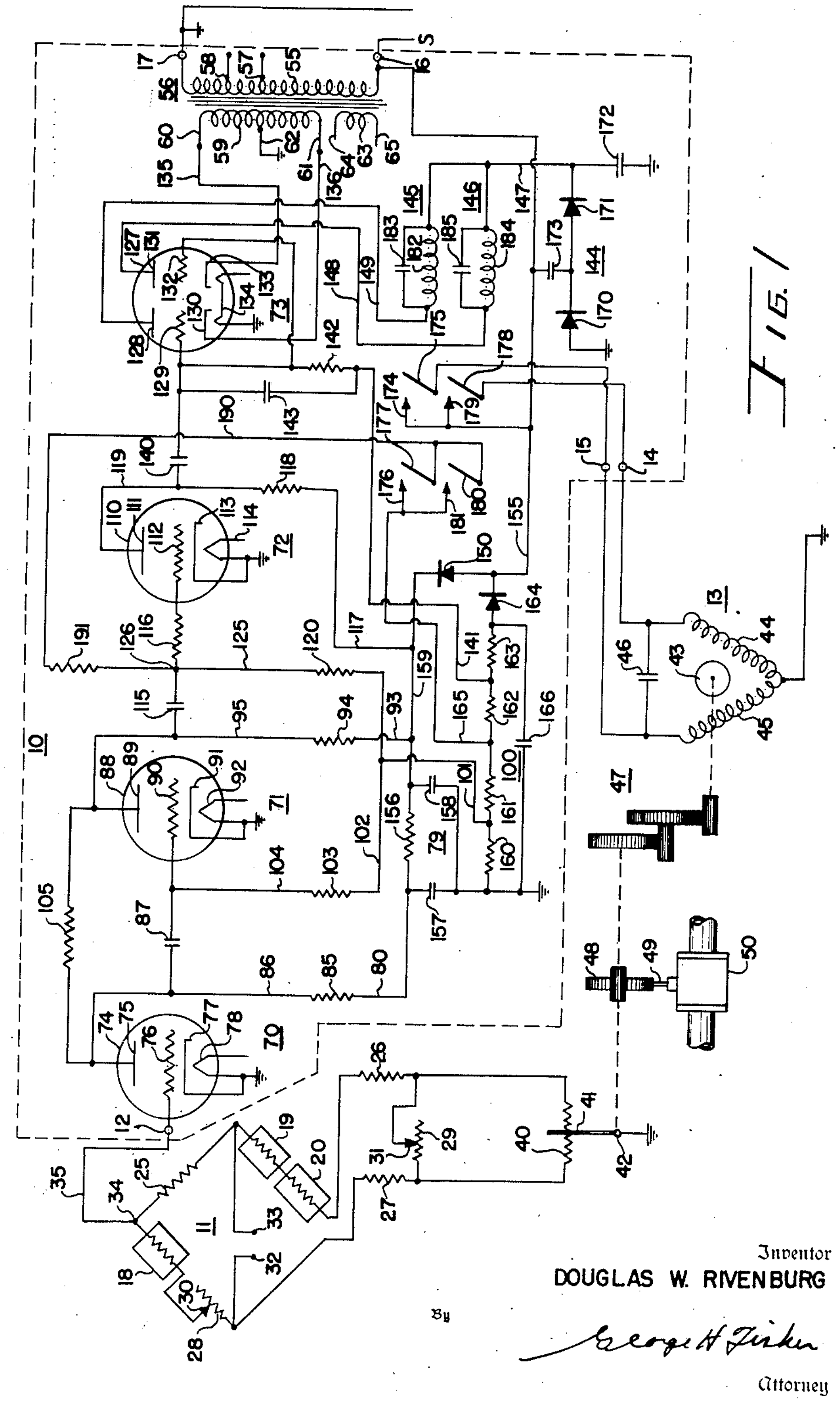

The present invention relates to electronic amplifier circuits and particularly to an electronic amplifier circuit incorporating a phase discriminator stage adapted for use in a system wherein a reversible motor is operated in accordance with changes in the phase of an input signal.

Such an apparatus might well be used in a temperature controlling mechanism for a closed chamber in which a temperature responsive network effectively applies a control signal to the input of the amplifier depending on the magnitude and direction of unbalance of the network from a given control point. It is desirable that such an amplifier circuit provide a means of preventing the controlled mechanism from overshooting the desired position established by the controlling network, thus, eliminating cycling about the established control point position which is commonly known as hunting.

Considerable difficulty has been experienced in some types of amplifiers as a result of the phase shift of the input signal with respect to the phase of a reference voltage on the motor. To eliminate such phase shift difficulties, A. C. discriminator stages have been added to such amplifiers in which an A. C. voltage becomes a reference voltage in the amplifier and any phase shift of the input signal only reduces the effectiveness of the signal, rather than cause possible faulty operation. In this type of amplifier under certain conditions the sensitivity of the amplifier is often reduced by the reverse flow of electrons in the electronic discharge devices used in the discriminator stage when the anode reference voltage swings negative. This phenomena is more commonly known as back emission. In a discriminator stage having at least two electron discharge devices forming two sections in which the control electrodes of the two sections are commonly connected, the reverse electron flow in one section can render small input signals nearly ineffective in one and sometimes in both sections of the stage.

The present invention is arranged so that the back emission difficulties of the discriminator stage of the amplifier are eliminated and the A. C. reference voltage is retained in the discriminator stage. The invention also provides a simplified means for rendering the control signal periodically ineffective, thereby causing intermittent operation of the load device to eliminate any hunting tendencies.

It is therefore an object of the invention to provide an amplifier having an improved discriminator stage wherein there is no back emission.

Another object of the invention is to provide an amplifier having an improved discriminator stage wherein an A. C. reference voltage is used in the discriminator which is arranged to eliminate any reverse current flowing tendencies of the components of the stage.

Still another object of the invention is to provide an amplifier that has an improved and simplified means to selectively render an input signal, that is intended to operate a load device, intermittently or continuously effective depending on the magnitude of the input signal.

Another object of the invention is to provide an amplifier that has an improved and simplified means of changing the biasing circuit of such amplifier so that a motor that is being controlled by a control network indirectly through the amplifier can be operated continuously or intermittently in one direction of rotation or the other depending on the magnitude and phase relation of the signal received from the control network.

Figure 2:
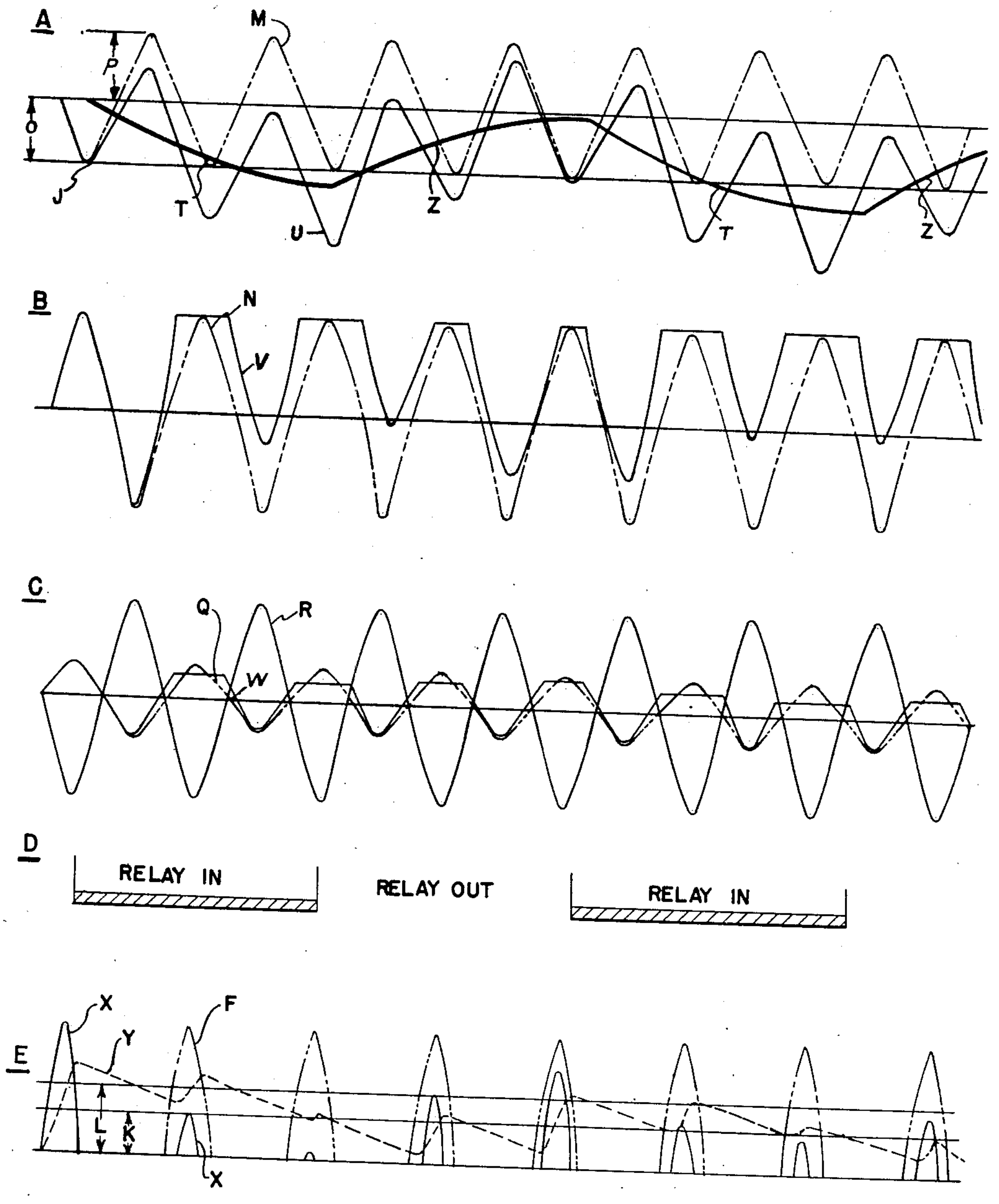

Other objects and advantages of my invention will become apparent from a consideration of the appended specification, and drawings, in which:

Figure 1 is an electrical wiring diagram of the amplifier and a control system wherein the amplifier may be advantageously used, Figure 2 is a graphical representation of the control signals and voltages causing operation of the amplifier circuit shown in Figure 1.

*Figure 1*

Referring to Figure 1, my invention is shown to comprise an electronic amplifier 10 which has a bridge network 11 connected to an input terminal 12 of the amplifier 10 and a reversible motor 13 connected to output terminals 14 and 15 of the amplifier 10. The amplifier 10 is operated from a source of alternating power that is connected to the power terminals 16 and 17.

The bridge network 11 that is connected to the input terminal 12 can be any type of bridge network that produces a variable magnitude alternating signal in which the magnitude of the output signal of the network depends on the unbalance condition of the network, and the phase of the output signal of the network will depend on the direction of the unbalance of the bridge. The bridge network 11 comprises an upper left leg having a variable resistance element 28 and a slider 30 and a temperature sensitive element 18, an upper right leg having a fixed resistance element 25, a lower left leg having a fixed resistance element 27, and a lower right leg having two temperature sensing elements 19 and 20, and a fixed resistance element 26. A variable resistance element 29 is connected between the lower extremities of the lower left and lower right legs of the bridge network 11 and has a slider 31. An alternating potential source, not shown, is connected to the bridge 11 by means of two input terminals 32 and 33. The input terminal 32 is connected between the upper left and lower left legs of the bridge 11 and the input terminal 33 is connected between the upper right and lower right legs of the bridge. An output terminal 34 of the bridge 11 is at the connection of the upper left and upper right legs of the bridge network and is connected to the input terminal 12 of the electronic amplifier 10 by means of a conductor 35. Another resistance element 40, having a slider 41 that is connected to ground by means of a connection 42, which forms another output terminal for the bridge, is connected to bridge 11 in parallel with the variable resistance element 29. It is therefore obvious to those familiar with the art that if the bridge network 11 becomes unbalanced a signal will appear at the output terminals 34 and 42 of the bridge having a phase relation depending on the direction of unbalance and a magnitude depending on the amount of unbalance that exists.

The motor 13 is provided with two field windings 44 and 45 and a rotor 43. One end of each of the motor windings 44 and 45 is connected to a common ground terminal and the other ends of the two windings are connected to the output terminals 14 and 15 of the amplifier 10. A capacitor 46 is connected between the two windings 44 and 45 of the motor in such a manner that the capacitor is across the output terminals 14 and 15. The motor 13 is of the split phase type wherein alternating power is applied to one or the other of the two terminals 14 or 15 to cause the motor to run in one direction or the other. The motor rotor 43 is mechanically coupled to a gear train 47 which produces a reduction in the angular movement of the output shaft of the motor. The output shaft of the gear train 47 is mechanically coupled to a second gear mechanism 48 and also to the slider arm 41 of the bridge network 11. The gear mechanism 48 is connected by means of a shaft 49 to a valve 50. Therefore, it is to be understood that the operation of the reversible motor 13 will control the position of the slider arm 41 on the bridge network 11 and also change the output of the valve 50. In this particular case the valve 50 can control the heat input to the chamber whose temperature is being controlled by the temperature sensitive bridge network 11.

As stated above, the power is supplied by a source of power, not shown, connected to the power terminals 16 and 17. The grounded side of the input power source is connected to the terminal 17. The end terminals of a primary winding 55 of a transformer 56 are connected to the power terminals 16 and 17. The primary winding 55 also has two taps 57 and 58. The transformer 56 also comprises a secondary winding 59 having two end terminals 60 and 61 and a grounded center tap 62, and a second winding 63 having two end terminals 64 and 65.

The electronic amplifier 10 comprises three stages of amplification 70, 71 and 72 and a discriminator stage 73 that is connected to the output of the third stage of amplification 72. The first stage of amplification 70 comprises a triode 74 which can be a commercial type tube such as a subminiature tube #5744, having an anode 75, a control electrode 76, and a cathode 77 which is heated by a heater 78. The anode 75 of the first stage of amplification 70 is supplied a positive unidirectional potential by a power supply 79 through a circuit that can be traced from the power supply 79, through a conductor 80, a plate resistor 85, a conductor 86, and to the anode 75. The output of the first stage of amplification 70 is connected to the input of the second stage 71 by means of a capacitor 87 that will pass an alternating signal and not direct current.

The second stage of amplification 71 comprises a similar triode 88 having an anode 89, a control electrode 90, and a cathode 91 which is heated by a heater 92. The second stage of amplification 71 is also supplied a unidirectional potential from the power supply 79 by means of a circuit that can be traced through a conductor 93, a plate resistor 94, and a conductor 95 to the anode 89. The input circuit of the second stage of amplification 71 is connected to the control electrode 90 which is biased in a conventional manner by means of a negative D. C. potential that is obtained from a second power supply 100 through the circuit that may be traced from a conductor 101, a conductor 102, a bias resistor 103, and a conductor 104 to the control electrode 90. A feedback resistor 105 is connected between the anodes 75 and 89 of the first two stages of amplification. This feedback resistor feeds back a portion of the voltage from the second stage of amplification thereby reducing the effectiveness of the output of the first stage of amplification and also provides an amplifier circuit that has a greater stability and less tendency of developing an internal oscillation.

The third stage of amplification 72 comprises another similar triode 110 having an anode 111, a control electrode 112, and a cathode 113 that is heated by a filament 114. The output of the second stage of amplification 71 is fed into the input circuit of the third stage of amplification by means of a blocking capacitor 115 and a resistor 116 and the circuit can be traced from the anode 89, through the capacitor 115, and resistor 116 to the control electrode 112 of the triode 110. The voltage drop across a grid limiting resistor 116 reduces the bias voltage between the control electrode 112 and ground should the input signal to the third stage of amplification exceed a predetermined positive maximum value and a grid current flow between the control electrode 112 and the cathode 113 of the electronic discharge device 110. The anode 111 of the third stage of amplification 72 is provided with a unidirectional positive potential from the power supply 79 through a circuit that can be traced from a conductor 117, through a resistor 118 and a conductor 119 to the anode 111. The input circuit of the third stage of amplification 72 is provided with a negative bias voltage that is supplied from the power supply 100 through a circuit that can be traced from a conductor 101, through a resistor 120, conductor 125 to a common terminal connection 126 that is positioned between the condenser 115 and the resistor 116, the latter being connected to the control electrode 112. In the first three stages of amplification the cathodes of each of the three triodes are connected to ground as well as one of the two end terminals of each of the heaters 78, 92 and 114. The second end terminal of the three heater elements are connected to the tap 58 on the primary winding 55 of the transformer 56.

The discriminator stage 73 comprises a discriminator tube 127 which is known as the commercial miniature tube type #5687 having two triode sections. The first section in the discriminator tube 127 comprises an anode 128, a control electrode 129, and a cathode 130; and the second section comprises an anode 131, a control electrode 132, and a cathode 133. The cathodes of the two sections of the discriminator tube 127 are heated by means of a heater element 134 having two end connections, one of which is connected to ground and the other being connected to the tap 57 on the primary winding 55 of the transformer 56. The cathodes 130 and 133 of the discriminator tube 127 are connected to the end terminals 60 and 61 of the secondary winding 59 of the transformer 56 by means of the conductors 135 and 136, respectively, to apply a reference potential on the cathodes of the discriminator stage such that the cathodes 130 and 133 will be alternately and oppositely positive and negative with respect to the center tap or ground terminal 62. The control electrodes 129 and 132 of the discriminator stage are commonly connected to the output of the third stage of amplification 72 by means of a coupling capacitor 140 through a circuit that can be traced from the anode 111, through a conductor 119, and a capacitor 140 to the control electrodes of the discriminator stage. A negative bias potential is supplied to the control electrodes of the discriminator stage by the power supply 100 by a circuit that can be traced through a conductor 141, a filtering network consisting of the parallel combination of a resistor 142 and a capacitor 143, to the control electrodes of the discriminator tube 127. Another source of unidirectional potential of a positive value is supplied to the anodes 128 and 131 of the discriminator stage from a power supply 144. The circuit can be traced from the power supply 144, through the conductor 147, a relay assembly 145, and a conductor 149 to the anode 128; and from the conductor 147, a relay assembly 146, and conductor 148 to the second anode 131.

It is therefore obvious from the circuits that have been traced above that an input signal can be applied to the input terminal 12 of the amplifier 10 and be amplified by the three stages of amplification before being applied to the input terminal of the discriminator stage of the amplifier. The discriminator stage, as will be explained in more detail below is effective to energize one or the other of the two relay assemblies depending on the phase relation and magnitude of the received input signal.

The power supply 79 comprises a unidirectional current conductor or rectifier 150, which may be of the selenium type of rectifier. This rectifier is connected by means of a conductor 155 to the input power terminal 16. The output of the rectifier 150 is connected to a filtering network comprising a resistor 156 and two capacitors 157 and 158. The power supply circuit 79 can be traced through the conductor 155, the rectifier 150, and conductor 159 that contains the junction of conductors 93 and 117, to the parallel filter network comprising two legs, one of which is the capacitor 158 connected to ground and the other is the series connection of the resistor 156 and the capacitor 157 that is connected to ground. The conductor 80 is connected to the power supply 79 at the junction of the resistor 156 and the condenser 157.

The power supply 100 comprises a number of series connected resistors 160, 161, 162 and 163 that are connected to a second unidirectional current conductor or rectifier 164. A circuit can be traced from the ground terminal through the resistor 160, the resistor 161, the resistor 162, the junction of conductor 141, the resistor 163, the rectifier 164, and the conductor 155 to the input power terminal 16. A capacitor 166 is placed from the ground connection to the junction of the resistance 163 and the rectifier 164.

The third power supply 144 is a voltage doubler circuit and comprises two unidirectional current conductors or rectifiers 170 and 171 connected in series in such a manner that a circuit can be traced from a ground terminal, through the rectifier 170, the second rectifier 171, the junction of the conductor 147, to a capacitor 172, and back to the ground connection. Alternating power for the supply 144 is obtained from the input terminal 16 through a circuit that can be traced through the conductor 155, and a capacitor 173 to a junction between the two rectifiers 170 and 171.

In the power supply 79 when the alternating potential that is supplied from the input terminal tors 157 and 158 which smooths the voltage wave 16 is positive the rectifier 150 conducts current, pulse that charges the capacitors 157 and 158 so that a positive direct current voltage is available at the anodes of the three stages of amplification 70, 71 and 72. A resistance 156 is a component of the filtering network comprising the capacitors 157 and 158 which smooths the voltage wave that is applied to the first stage of amplification 70.

The rectifier 164 in the power supply 100 is connected in such a manner that the voltage drop across the series resistors provides a negative source of potential with respect to ground when measured at each of the voltage taps. The capacitor 165 is placed across the series resistance network to provide a filtering means to smooth out the half wave pulses derived from the rectifier.

In the third power supply 144 when a negative voltage of the negative voltage cycle of alternating voltage available from terminal 16 is applied to the capacitor 173 the capacitor is charged by a current flowing from ground through the rectifier 170. On the second half cycle of the alternating voltage when the voltage is positive a current will flow through the rectifier 171 to charge the capacitor 172 to a value of voltage approximately equal to the sum of the positive applied voltage and the voltage across condenser 173. A voltage of approximately twice the applied voltage from the alternating source is available at the conductor 147 and is applied to the discriminator stage 73.

The relay assemblies 145 and 146 each comprise two sets of blades and contacts. The first relay assembly 145 has a first set of contacts comprising a movable blade 175 and a permanent contact 174; and a second set of contacts comprising a permanent contact 176 and the movable blade 177. The second relay assembly 146 also comprises a first set of contacts having a permanent contact 179 and a movable blade 178; and a second set of contacts having a permanent contact 181 and a movable blade 180. The relay of the relay assembly 145 comprises a winding 182 that is shunted by a capacitor 183. Similarly constructed is the relay assembly 146 which comprises a winding 184 and a capacitor 185 shunting the winding.

The contacts 174 and 179 of the first set of contacts of each of the relay assemblies are connected to the conductor 155 which is connected to the power supply input terminal 16. The movable blades 175 and 178 of the two relay assemblies are connected to the output terminals 14 and 15, respectively, of the amplifier 10. It is obvious from the connection that the direction of operation of the motor 13 will depend on which of the relay assemblies 145 or 146 is energized. If the relay assembly 145 is energized the motor 13 will rotate in one direction as a result of the phase relation of the current in the windings 44 and 45. If the second relay assembly 146 is energized the operation of the motor 13 will be in the opposite direction. It is therefore to be noted that the operation of the motor 13 depends on which section of the discriminator stage 73 conducts a current of a sufficient magnitude to operate the relay assembly in the circuit therewith.

The second set of contact members of the two relay assemblies 145 and 146 have the permanent contacts 176 and 181 connected to the conductor 165 which, as stated before, is connected between the resistors 161 and 162 of the power supply 100. The movable blades 177 and 180 are connected in common to a conductor 190 which is connected to a resistor 191. The resistor 191 is connected to the junction 126 which is in the control circuit of the third stage of amplification in such a manner as to make a circuit from the control electrode 112 of the amplification stage 72, through the resistor 116, junction 126, resistor 191, conductor 190, parallel relay assembly, and conductor 165 to the power supply 100. From the foregoing circuit it is obvious that if either of the two relay assemblies 145 or 146 should be energized the associated contacts 176 and 177 or 181 and 180, would operate to apply a bias from the power supply 100 to the control electrode 112.

The values set forth in the following table are provided to illustrate more completely the specific amplifier circuit which has been constructed to carry out the principles of my invention. It should be understood, however, that these values are provided by way of example only, and that other values may be used without departing from my invention.

| Reference Numeral | Quantity | Suggest Value |
|---|---|---|
| 105 | Resistance | 2.2 megohms. |
| 85 | do | 100,000 ohms. |
| 103 | do | 470,000 ohms. |
| 94 | do | 1.0 megohms. |
| 156 | do | 1.5 megohms. |
| 120 | do | 22 megohms. |
| 191 | do | 33 megohms. |
| 116 | do | 4.7 megohms. |
| 118 | do | 100,000 ohms. |
| 142 | do | 1.0 megohms. |
| 160 | do | 1,500 ohms. |
| 161 | do | 20,000 ohms. |
| 162 | do | 22,000 ohms. |
| 163 | do | 100,000 ohms. |
| 87 | Capacitance | 0.01 microfarad. |
| 157 | do | 0.1 microfarad. |
| 158 | do | 0.35 microfarad. |
| 166 | do | 1.0 microfarad. |
| 115 | do | 0.01 microfarad. |
| 140 | do | 0.01 microfarad. |
| 143 | do | 0.001 microfarad. |
| 183 | do | 0.25 microfarad. |
| 185 | do | 0.25 microfarad. |
| 172 | do | 1.0 microfarad. |
| 173 | do | 1.0 microfarad. |
| 60, 61 | voltage | 20 volts each side of tap 62. |
| 57 | do | 12.6 v. to ground. |
| 58 | do | 6.3 v. to ground. |
| 16 | do | 115 volts to ground or terminal 17. |
| 147 (conductor) | do | 220 volts D. C. with no load. |
| 101 (conductor) | bias voltage | −1.5 volts. |
| 165 (conductor) | do | −20.0 volts. |
| 141 (conductor) | do | −42.0 volts. |

*Operation*

The temperature responsive network 11 on becoming unbalanced due to a change in the temperature of the temperature responsive resistance elements 18, 19 and 20 will produce a signal that is fed into the amplifier 10 at the input terminal 12. This signal voltage will be amplified to control one or the other of the relays 145 and 146 to thereby effect energization of the motor 13 which will drive the value 50 and the slider arm 41. Assuming that one of the temperature responsive resistances in the temperature responsive bridge network is enclosed in a chamber that is being heated by the medium that is passed through the valve 50, if the temperature inside the chamber drops to a value lower than the control point that is set in the temperature responsive bridge, the amplifier 10 will cause rotation of the motor in such a direction so as to increase the heat input to the chamber and at the same time move the slider arm 41 in a direction to rebalance the bridge network 11. As the temperature of the chamber increases and the bridge will again become unbalanced, in the opposite direction, a signal will be produced on the input of the amplifier to effect rotation of the motor in the opposite direction to reduce the flow through the valve 50 and also move the slider arm 41 in the opposite direction to produce a balanced condition in the bridge network 11. By means of the variable resistance element 28 in the bridge network 11 it is possible to select a desired control point. By means of the variable resistance element 29 and the wiper arm 31, the sensitivity of the resistance element 40 can be increased or decreased. This sensitivity adjustment not only provides for a greater or less movement in the position of the slider arm 41 but also provides for an adjustment as to the maximum and minimum range of operation of the valve 50 at a given unbalance of the temperature responsive bridge 11.

In first considering the details of the invention the amplifier will be explained with the conductor 165 disconnected from the power supply 100. Let us assume that the temperature responsive bridge 11 becomes unbalanced in one direction and a signal of a given magnitude and phase relation is impressed on the amplifier at the input terminal 12. The signal is amplified by means of the first, the second, and the third stages of amplification in a conventional manner. Referring to Figure 2, sub-section A, the curve M is a graphical representation of the voltage that is impressed on the third stage of amplification 72 at the control electrode 112. The grid voltage wave M is shown to be biased above the cutoff voltage J of the triode 110 by the distance O and the positive cycle of the grid voltage wave M is shown not to exceed the distance P, therefore, at no time does the grid voltage wave M produce a positive bias on the grid or pass below the cutoff voltage J of the triode 110. In section B, of Figure 2, the voltage output wave of the triode 110 is shown as the curve N. It is, therefore, obvious that the A. C. component of the output from the third stage of amplification will be impressed on the input of the discriminator stage through the coupling capacitor 140. The voltage that is present on the control electrodes 129 and 132 of the discriminator stage 73 is shown in section C, of Figure 2, as the voltage curve Q. In the section C, the curve designated as R represents the alternating reference voltage that is impressed on one of the cathodes of the discriminator stage 73 by the primary winding 59 of the transformer 56. Assuming that the curve R is the voltage on the cathode 130 of the first section of the discriminator tube 127 and the voltage wave Q as stated before is the voltage on the control electrode 129 of the same section. When the voltage wave Q is positive with respect to the voltage wave R, the first section of the discriminator tube will conduct current from the power supply 144 through the relay assembly 145 and through the first section of the discriminator tube 127. In section E, of Figure 2, the wave form F represents the current output of the first section of the discriminator tube 127. While it is not shown in section C of Figure 2, the anode voltage for the anode 128 of the first section of the discriminator tube 127 is at a positive unidirectional potential that is obtained from the power supply 144 as stated before in the specification.

The problems associated with back emission, commonly known to be the electron flow from the anode to the control electrode of an electronic discharge device, are frequently present when the anode potential of an electronic discharge device becomes negative with respect to the control electrode. In a phase discriminator circuit, back emission often results in a changing of the bias voltage of the input circuit comprising the two control electrodes of the discriminator tube such that the input signal is less effective. In the discriminator stage of this invention the anodes 128 and 131 of the discriminator tube are maintained at a positive D. C. potential. Therefore, at no time does the potential of the control electrodes become more positive than the anode potential and no back emission can exist.

Common to all phase discriminator circuit is the need of a reference voltage. In this invention the two cathodes of the discriminator tube are connected to the end terminals of a transformer having the center tap that is grounded so that the reference voltage is applied to the cathodes.

The operation when the conductor 165 is connected to the power supply 100 at the junction of the resistors 161 and 162 will now be considered. This connection provides for applying a negative bias to the control electrode of the third stage of amplification 72 when either of the relay assemblies 145 or 146 is energized. Assuming that the relay assembly 145 is energized as a result of the discriminator tube current and the movable blade 177 makes contact with the contact 176, a circuit can be traced from the power supply 100, through the conductor 165, the contact assembly, conductor 190, and the resistor 191 to the junction 126. This connection will cause an increase in the negative bias that is applied to the control electrode 112 of the triode 110. When the switching action of the relay assembly 145 occurs, the negative bias does not change instantaneously on the control electrode 112, however, the capacitor 115 that is used as the coupling capacitor between the second and third stages of amplification provides an RC delay network in conjunction with the resistance 191. Referring to the section A, of Figure 2, the change of the negative bias P on the control electrode 112 of the triode 110 is shown by the curve T. It should be understood that the time constant of the RC network comprising the capacitor 115 and the resistor 191 is much longer than that shown by the curve T with respect to the frequency of the voltage signal M, however, for purposes of explanation it will be shown as occurring in a shorter time. In section A, the curve U represents the grid voltage of the amplification stage 72 and is obtained by the algebraic addition of the values of the voltage curve M and the bias voltage shown by the curve T. In section B the curve V represents the output voltage of the amplifier stage 72 which in turn reflects into the discriminator stage the grid voltage curve W shown in section C. The action of the discriminator tube depends upon the positive magnitude of the grid voltage curve W with reference to the voltage wave R that has been previously stated to be the voltage on the cathode 130 of the discriminator tube 127. In section E of Figure 2, the solid line curve designated as X represents the output of the first section of the discriminator stage 73 as a result of the changing bias action on the third stage of amplification 72 that is shown in section A of Figure 2. In section E, of Figure 2, the distance K and L represents the magnitudes of the drop-out and pull-in current, respectively, of the relay assembly 145. Since the discriminator tube only conducts during one half of the alternating voltage cycle the output of the first section of the discriminator stage will be a half-wave pulsating current such as shown by the curve in section E of Figure 2.

The capacitor 183 that is connected in parallel with the relay winding 182 of the relay assembly 145 charges when each pulse of current is obtained from the discriminator tube and discharges during the next half cycle so as to maintain energization of the relay between the half-wave current pulses. In section E, of Figure 2, the curve Y represents the current in the relay winding 182 as a result of the charging and discharging of the parallel connected capacitor. When the current Y in the relay winding reaches a magnitude that is equal to the pull-in current of the relay assembly shown as L, the relay will operate. At the same time that the relay operates as shown in section D the bias voltage as shown in section A, of Figure 2, will begin to change on the curve T. As the current pulses to the relay winding that are shown as the solid line curve X, in section E, become smaller and smaller the relay assembly will drop out when the current Y in the relay winding decreases to a magnitude that is smaller than the drop out current K. When the relay drops out, the additional negative bias that is applied by the junction of the conductor 165 to the power supply 100 will be disconnected from the control electrode 112 of the amplification stage 72. Since the capacitor 115 charged to a voltage value that is more negative than that charge that would be obtained from the normal bias on the control electrode the condenser will discharge through the circuit that can be traced through the conductor 125, the resistor 120, and the conductor 101 to the power supply 100. The value of the resistor 120 can be selected so that the time constant of the RC combination of the capacitor 115 and the resistor 120 is of such a value to obtain a desired null timing. The discharging of the voltage bias on the control electrode 112 of the triode 110 is shown in the section A, of Figure 2, by the voltage curve Z. While the curve U was shown to be an algebraic addition of the voltage curve M and the bias voltage T, it is continued as the algebraic addition of the same curve M and bias voltage Z. As the grid voltage for the amplification stage 72 increases in a positive direction on the voltage bias wave Z the output of the discriminator section will increase and the current pulses designated as curve X in section E, of Figure 2, will also increase. The relay current Y on exceeding the pull in current value L will cause operation of the relay and thus start a second operation of the same cycle previously explained.

In the explanation of the operation of this circuit a particular signal voltage to the third stage of amplification 72 was selected as shown in section A, of Figure 2, as the wave form M. It is obvious that if the unbalance of the bridge network 11 was greater the amplitude of the grid voltage wave M would be increased. While an increased magnitude in the grid voltage wave M would cause the grid to be positive on the triode 110 and also on the negative cycle to go below the cutoff value of the triode tube 110, it is also important to recognize that with this increased magnitude in the voltage curve M it would be possible that the lowering of the bias voltage as shown in the curve T would not lower the positive swing of the grid voltage sufficiently below the cutoff value. Therefore, the relay would not drop out until the bridge network 11 had been rebalanced sufficiently to reduce the magnitude of the input signal to the triode 110. The cycling action that is obtained by applying the negative bias to the control electrode 112 of the third stage of amplification is shown to be ineffective if the input signal M has magnitude of such a value that the output current of the amplifier stage 72 maintains an operational signal on the control circuit of the discriminator stage 73.

The operation of the discriminator stage and the relay assembly has been specifically directed to one section of the discriminator stage and one relay assembly. It should be understood that if the signal received from the bridge network 11 should be of the opposite phase, having an unbalance condition on the opposite side of the control point, the wave form that is shown in section A, of Figure 2, designated as curve M, would be reversed approximately 180 degrees. The same action would then take place as explained before except with the reversed phase input signal and the relay assembly 146 would be controlled.

The intermittent operation of the discriminator circuit as previously explained is known as an anti-hunting operation. When the bridge circuit 11 is extremely unbalanced a large signal is applied to the input terminal 12 to cause operation of the motor in the output circuit, however, as the input signal is reduced the motor operates intermittently in pulses which become shorter. This operation prevents overshooting or cycling about the control point. In this invention this anti-hunt operation is accomplished by an improved and simplified means requiring two resistors 120 and 191 and the coupling capacitor 115 which also connects the second and third stages of amplification.

While I have shown and described certain preferred embodiments of my invention, modification will readily occur to those who are skilled in the art, and I therefore wish my invention to be limited only by the scope of the appended claims.

I claim as my invention:

1. An electronic amplifier comprising in combination: an output stage having an input and an output circuit; a voltage amplification stage having an anode, a cathode, and a control electrode; a relay; circuit means connecting said anode to said input circuit and said output circuit to said relay; a coupling capacitor; an input signal circuit; a circuit means connecting said input signal circuit through said coupling capacitor to said control electrode; a source of unidirectional voltage supply connected to said cathode and having a first tap at a potential negative with respect to said cathode and a second tap at a potential even more negative with respect to said cathode; a first circuit extending from the junction of said coupling capacitor and said control electrode to said first tap and including resistance means to form with said capacitor, a first resistance-capacitor circuit, said first resistance-capacitor circuit normally being effective to bias said voltage amplification stage so that in the absence of an input signal said relay is not effectively energized; and a second independent connection extending from the junction of said coupling capacitor and said control electrode to said second tap, said second connection being controlled by said relay and effective only when said relay is operatively energized to tend to increase the bias of said voltage amplification stage so as to tend to cause deenergization of said relay unless said signal is above a predetermined value, said second connection furthermore comprising resistance means but including none of the resistance of said first connection so that the time constant of the circuit including said second connection is unaffected by the resistance in said first connection.

2. An electronic amplifier comprising in combination: an output stage having an input and an output circuit; a voltage amplification stage having an anode, a cathode, and a control electrode; a relay; circuit means connecting said anode to said input circuit and said output circuit to said relay; a coupling capacitor; an input signal circuit; circuit means connecting said input signal circuit through said coupling capacitor to said control electrode; a plurality of sources of unidirectional biasing voltage connected to said cathode; a first circuit extending from the junction of said coupling capacitor in said control electrode to the first of said sources of biasing voltage and including resistance to form with said capacitor, a first resistance-capacitance circuit, said first resistance-capacitance circuit normally being effective to bias said voltage amplification stage so that in the absence of an input signal said relay is not effectively energized; and a second independent connection extending from the junction of said coupling capacitor and said control electrode to said second source of biasing voltage, said second connection being controlled by said relay and effective only when said relay is operatively energized to tend to increase the bias of said voltage amplification stage so as to tend to cause deenergization of said relay unless said signal is above a predetermined value, said second connection furthermore comprising resistance means but including none of the resistance of said first connection so that the time constant of the circuit including said second connection is unaffected by the resistance in said first connection.

3. An electronic circuit comprising in combination: an amplification stage including a first and a second electronic discharge device each having an anode, a control electrode, and a cathode, means for producing an electrical signal potential having a magnitude and a phase characteristic dependent on the magnitude and direction of the unbalance of said means, said means being connected to the input circuit of said amplification stage; an output stage having two anodes, two control electrodes, and two cathodes; a source of irreversible unidirectional potential; two current actuated devices; circuit means connecting said source through one of said current actuated devices to the first of said two anodes and connecting said source through the other of said current actuated devices to the second of said two anodes; a source of alternating potential having two end terminals and a tap; a coupling capacitor; circuit means connecting said end terminals to said two cathodes; circuit means connecting said anode of said first electronic discharge device through said capacitor to the control electrode of said second electronic discharge device; circuit means connecting said anode of said second discharge device to said two control electrodes so that said amplification stage on receiving a selective signal having an amplitude above a first determined minimum value at the control electrode of said first electronic discharge device will selectively effect operation of one of said current actuated devices; a plurality of sources of biasing voltage connected to said cathode of said second discharge device; a first circuit extending from the junction of said coupling capacitor and said control electrode of said second discharge device to the first of said sources of biasing voltage and including resistance to form with said capacitor a first resistance-capacitance circuit, said first resistance-capacitance circuit normally being effective to bias said amplification stage so that in the absence of an input signal said current actuated devices are not effectively energized; and a second independent connection extending from said junction to said second source of biasing voltage, said second connection being controlled by said current actuated devices and effective only when one of said current actuated devices is operatively energized to tend to cause de-energization of said current actuated means unless said signal potential exceeds a second predetermined value, said second connection furthermore comprising resistance means but including none of the resistance of said first connection so that the time constant of the circuit including said second connection is unaffected by the resistance in said first connection.

4. An electronic amplifier comprising in combination: a discriminator stage having two anodes, two control electrodes, and two cathodes; a voltage amplification stage having an anode, a cathode and a control electrode; a pair of relays; circuit means connecting the anode of said amplification stage to said two control electrodes; a source of irreversible unidirectional potential; circuit means connecting said two anodes to said unidirectional source through said relays; a coupling capacitor; an input signal circuit; circuit means connecting said input signal circuit through said coupling capacitor to said control electrode; a plurality of sources of unidirectional biasing voltage connected to said cathode; a first circuit extending from the junction of said coupling capacitor and said control electrode to the first of said sources of biasing voltage and including resistance means to form with said capacitor a first resistance-capacitance circuit, said first resistance-capacitance circuit normally being effective to bias said voltage amplification stage so that in the absence of an input signal said relay is not effectively energized;

and a second independent connection extending from said junction to said second source of biasing voltage, said second connection being controlled by said relays and effective only when one of said relays is operatively energized to tend to increase the bias of said voltage amplification stage so as to tend to cause de-energization of said relay unless the signal is above a predetermined value, said second connection furthermore comprising resistance means but including none of the resistance of said first connection so that the time constant of the circuit including said second connection is unaffected by the resistance in said first connection.

5. An electronic control device comprising in combination: a discriminator stage having two anodes, two control electrodes, and two cathodes; an amplification stage; a source of signal potential; circuit means including said amplification stage for connecting said source to said two control electrodes; a source of irreversible unidirectional potential; a plurality of current actuated devices one or the other of which it is desired to actuate depending on the phase of said signal potential; circuit means connecting said source of unidirectional potential to said two anodes through said current actuated devices; a source of alternating biasing voltage; circuit means connecting said two cathodes to said source of biasing voltage for biasing said discriminator stage to insure only one of said anode circuits conducts for a given phase of signal voltage; and means operable upon either of said current actuated devices being energized to change the potential applied to said control electrodes to tend to de-energize said current actuated device.

6. An electronic control device comprising in combination: a discriminator stage having two anodes, two control electrodes, and two cathodes; a source of signal potential; circuit means for connecting said source to said two control electrodes; a source of irreversible unidirectional potential; a plurality of relays one or the other of which it is desired to actuate depending on the phase of said signal potential; circuit means connecting said source of unidirectional potential to said two anodes through said relays; a source of alternating bias voltage; circuit means connecting said two cathodes to said source of biasing voltage for biasing said discriminator stage to insure only one of said anode circuits conducts for a given phase of signal voltage; and means operable upon either of said relays being energized to change the potential applied to said control electrodes to tend to de-energize said relay.

DOUGLAS W. RIVENBURG.

References Cited in the file of this patent

UNITED STATES PATENTS

| Number | Name | Date |
|---|---|---|
| 1,801,657 | Buyko | Apr. 21, 1931 |
| 2,150,440 | Hargreaves | Mar. 14, 1939 |
| 2,224,119 | Harrison | Dec. 3, 1940 |
| 2,260,977 | Jones | Oct. 28, 1941 |
| 2,425,733 | Gille | Aug. 19, 1947 |
| 2,429,636 | McCoy | Oct. 28, 1947 |
| 2,434,822 | Van Beuren | Jan. 20, 1948 |
| 2,478,203 | McCoy | Aug. 9, 1949 |
| 2,507,304 | Hofstadter | May 9, 1950 |
| 2,556,556 | Schmitt | June 12, 1951 |
| 2,579,001 | Jeffers | Dec. 18, 1951 |